United States Patent [19]

Nasu

[11] Patent Number: 4,748,200
[45] Date of Patent: May 31, 1988

[54] THERMOSETTING RESINS AND ELECTRODEPOSITION COATING COMPOSITIONS CONTAINING THE SAME

[75] Inventor: Kohji Nasu, Nishinomiya, Japan

[73] Assignee: Takeda Chemical Industries, Ltd., Osaka, Japan

[21] Appl. No.: 23,702

[22] Filed: Mar. 9, 1987

[30] Foreign Application Priority Data

Mar. 18, 1986 [JP] Japan .................................. 61-61683

[51] Int. Cl.$^4$ ............................................. C08G 18/80
[52] U.S. Cl. ................................... 524/591; 524/840; 528/45
[58] Field of Search ................... 528/45; 524/591, 840

[56] References Cited

U.S. PATENT DOCUMENTS 4,009,133  2/1977  Jones ..................................... 528/45

FOREIGN PATENT DOCUMENTS 0000029  12/1978  European Pat. Off. .
2211542  7/1974  France .

Primary Examiner—Maurice J. Welsh
Attorney, Agent, or Firm—Wenderoth, Lind & Ponack

[57] ABSTRACT

A thermosetting resin which contains therein:
(a) goups represented by the formula of

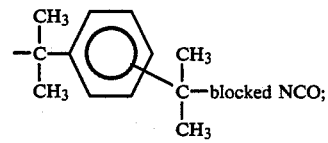

(b) hydroxyl groups; and
(c) quaternary ammonium salt groups which solubilize the resin in water;

the blocked NCO groups being stable in the presence of water, but reactive with the hydroxyl groups at elevated temperatures.

The resin is suitably used for cationic electrodeposition coating composition, which is especially low temperature curable, and provides coatings excellent in weatherability and corrosion resistance.

5 Claims, No Drawings

THERMOSETTING RESINS AND ELECTRODEPOSITION COATING COMPOSITIONS CONTAINING THE SAME

This invention relates to thermosetting resins and electrodeposition coating compositions containing the same, and more particularly, to thermosetting resins suitably usable as solubilized resin components in electrodeposition coating compositions which form low temperature curable coatings excellent in weatherability and corrosion resistance.

The cationic electrodeposition coating composition, which is used as primer on, e.g., automobiles, contains water-solubilized resins. The resins have heretofore been produced in general by reacting tolylene diisocyanate or diphenylmethane diisocyanate half-blocked with a blocking agent such as ethylene glycol monoethyl ether or 2-ethyl hexanol with epoxy resins of bis phenol A type, then by reacting the resultant with, e.g., diethylamine, followed by adding to the reaction product lactic acid or acetic acid to render it soluble in water. Usually water is used as a diluting solvent, and hydrophilic organic solvents are also usable as the diluting solvent, to provide electrodeposition coating compositions.

The conventional electrodeposition coating compositions as above form coatings excellent in corrosion resistance and chemical resistance, so that they are useful as primer coating for, among oythers, automobiles. However, the coatings are noticeably inferior in weatherability because of employing tolylene diisocyanate or diphenylmethane diisocyanate as diisocyanates, and there take place discoloration and chalking of the coating. Therefore, the conventional electrodeposition coating compositions are unusable to form top coating. Moreover, since the dissociation temperature of the blocking agent of the blocked isocyanate group is high, such a high baking temperature as 170°–190° C. is needed to form cured coatings.

The present inventor has made an intensive study to obtain resins for use in the electrodeposition process which are low temperature curable, and form coatings excellent in weatherability and corrosion resistance, and has found out that the use of specifically $\alpha,\alpha,\alpha',\alpha'$-tetramethylxylylene diisocyanate lowered the baking temperature to 130°–145° C. from 170°–190° C. in the conventional compositions, and besides, the resulting coating was excellent in weatherability and corrosion resistance.

It is, therefore, an object of the invention to provide thermosetting resins which are suitably used in electrodeposition coating compositions.

It is also an object of the invention to provide electrodeposition coating compositions which are low temperature curable, and form, in the cationic electrodeposition process coatings excellent in weatherability and corrosion resistance.

The thermosetting resin of the invention includes therein:

(a) groups represented by the formula of

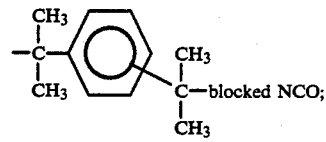

(b) hydroxyl groups; and (c) quaternary ammonium salt groups which solubilize the resin in water, the blocked NCO groups being stable in the presence of water, but reactive with the hydroxyl groups at elevated temperatures.

The above thermosetting resin is in accordance with the invention produced by methods as exemplified below:

The first method comprises:

(a) reacting half-blocked $\alpha,\alpha,\alpha',\alpha'$-tetramethylxylylene diisocyanate or a prepolymer of $\alpha,\alpha,\alpha',\alpha'$-tetramethylxylylene diisocyanate having at least one half-blocked isocyanate group and at least one free isocyanate group with an expoy group containing compound having at least one hydroxyl group;

(b) reacting the reaction product with an amine having active hydrogens to form a product which has amino groups therein; and (c) reacting the product with an acid to convert at least part of the amino groups to quaternary ammonium salts, thereby to solubilize the product in water.

The second method comprises:

(a) reacting an epoxy group containing compound with an amine having active hydrogens to form a product which has amino groups therein;

(a) reacting the product with half-blocked $\alpha,\alpha,\alpha',\alpha'$-tetramethylxylylene diisocyanate or a prepolymer of $\alpha,\alpha,\alpha',\alpha'$-tetramethylxylylene diisocyanate having at least one half-blocked isocyanate group and at least one free isocyanate group; and (c) reacting the product with an acid to convert at least part of the amino groups to quaternary ammonium salts, thereby to solubilize the product in water.

The third method comprises:

(a) reacting half-blocked $\alpha,\alpha,\alpha',\alpha'$-tetramethylxylylene diisocyanate or a prepolymer of $\alpha,\alpha,\alpha',\alpha'$-tetramethylxylylene diisocyanate having at least one half-blocked isocyanate group and at least one free isocyanate group with an unsaturated monomer having hydroxyl groups;

(b) copolymerizing the resultant reaction product with an unsaturated monomer having epoxy groups;

(c) reacting the resulting copolymer with an amine having active hydrogens to form a product which has amino groups therein; and (d) reacting the product with an acid to convert at least part of the amino groups to quaternary ammonium salts, thereby to solubilize the product in water.

The resin of the invention may also be prepared by methods suitably modifying the above three methods.

The half-blocked $\alpha,\alpha,\alpha',\alpha'$-tetramethylxylylene diisocyanate, which is hereinafter referred briefly to TMXDI, is obtained by the reaction of TMXDI with a blocking agent, and the prepolymer of TMXDI which has at least one blocked isocyanate group and at least one free isocyanate group, which is hereinafter referred briefly to as the partially blocked prepolymer, is obtained similarly by the reaction of the prepolymer with the blocking agent. The half-blocked TMXDI is preferred to the partially blocked prepolymer since the blocking reaction of isocyanate groups of TMXDI is more controllable.

In this specification, TMXDI may be any one of the isomers of m- and p-TMXDI which are represented as below, respectively. A mixture of these isomers are also usable. TMXDI is known compounds, and are producible by methods described in, for instance, U.S. Pat. Nos. 3,290,350, 4,130,577 and 4,439,616.

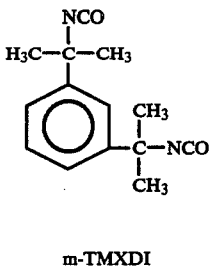
m-TMXDI

p-TMXDI

The prepolymer of TMXDI used in the invention has isocyanate groups at both the ends of the prepolymer, and is obtained by reacting TMXDI with a compound which has active hydrogens therein in such a manner that the amount of the isocyanate groups in in excess over the active hydrogens of the active hydrogen containing compound.

The active hydrogen containing compound usable is exemplified by low molecular weight compounds such as ethylene glycol, propylene glycol, diethylene glycol, dipropylene glycol, triethylene glycol, 2,2,4-trimethyl-1,3-pentanediol, neopentyl glycol, hexanediol, cyclohexanedimethanol, cyclohexanediol, hydrogenated bisphenol A, xylylene glycol, glycerine, trimethylol ethane, trimethylol propane, hexanetriol, pentaerythritol, sorbitol, sucrose, castor oil, ethylenediamine, hexamethylenediamine, ethanolamine, triethanolamine, water, ammonia or urea, and a variety of high molecular weight compounds such as polyether polyol, polyester polyol, acrylic polyol or epoxy polyol. These compounds may be used singly or as a mixture.

The prepolymer of TMXDI and the active hydrogen containing compound may be produced usually by reacting TMXDI with the active hydrogen containing compound at an equivalent ratio of NCO/active hydrogen of about 1.2-15, preferably about 1.5-6, at temperatures usually of 40°-140° C., preferably of 70°-100° C. In the reaction may be used a known catalyst, for example, tin, lead, zinc or iron compounds.

For either the half-blocking of the isocyanate groups of TMXDI or the partial blocking of the prepolymer, any known blocking agent is usable, such as, for example, phenol-, lactam-, active methylene-, alcohol-, mercaptan-, acid amide-, imido-, amine-, imidazole-, urea-, carbamate-, imine-, oxime-, or sulfite-type. Among these are especially advantageously employed phenol-, lactam-, alcohol- and oxime-type ones.

Examples of these blocking agents including the following.

Phenol-Type Blocking Agents:
  phenol, cresol, xylenol, nitrophenol, chlorophenol, ethylphenol, p-hydroxydiphenyl, t-butylphenol, o-isopropylphenyl, o-sec.-butylphenol, p-nonylphenol, p-t-octylphenol, hydroxybenzoic acid, hydroxybenzoic acid ester, etc.

Lactam-Type Blocking Agents:
  ε-caprolactam, δ-valerolactam, γ-butyrolactam, β-propiolactam, etc.

Active Methylene-Type Blocking Agents:
  diethyl malonate, dimethyl malonate, ethyl acetoacetate, methyl acetoacetate, acetylacetone, etc.

Alcohol-Type Blocking Agents:
  methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethyleneglycol monomethyl ether, diethylene glycol monoethyl ether, propylene glycol monomethyl ether, benzyl alcohol, methoxy methanol, glycolic acid, glycolates such as methyl glycolate, ethyl glycolate or butyl glycolate, lactic acid, lactic acid esters such as methyl lactate, ethyl lactate or butyl lactate, methylol urea, methylol melamine, diacetone alcohol, ethylene carbohydrin, ethylene bromohydrin, 1,3-dichloro-2-propanol, ω-hydroperfluoroalcohol, acetocyanohydrin, etc.

Mercaptan-Type Blocking Agents:
  butyl mercaptan, hexyl mercaptan, t-butyl mercaptan, t-dodecyl mercaptan, 2-mercaptobenzothiazole, thiophenol, methyl thiophenol, ethyl thiophenol, etc.

Acid Amide-Type Blocking Agents:
  acetanilide, acetaniside, acetotoluide, acrylamide, methacrylamide, acetamide, stearamide, benzamide, etc.

Imido-Type Blocking Agents:
  succinimide, phthalimide, maleimide, etc.

Amine-Type Blocking Agents:
  diphenyl amine, phenyl naphthyl amine, xylydine, N-phenyl xylydine, carbazole, aniline, naphthyl amine, butyl phenyl amine, etc.

Imidazol-Type Blocking Agents:
  imidazole, 2-ethylimidazole, etc.

Urea-Type Blocking Agents:
  urea, thiourea, ethylene urea, ethylene thiourea, 1,3-diphenyl urea, etc.

Carbamate-Type Blocking Agents:
  phenyl N-phenyl carbamate, 2-oxazolidone, etc.

Imine-Type Blocking Agents:
  ethylene imine, propylene imine, etc.

Oxime-Type Blocking Agents:
  formamidoxime, acetaldoxime, acetoxime, methyl ethyl ketoxime, diacetyl monoxime, benzophenone oxime, cyclohexanone oxime, etc.

Sulfite-Type Blocking Agents:
  sodium bisulfite, potassium bisulfite, etc.

The half-blocked TMXDI and partially blocked prepolymer of TMXDI are obtained by the reaction of TMXDI and its prepolymer with a blocking agent as above, respectively, in a conventional manner. In the blocking reaction, the equivalent ratio of NCO groups to the active hydrogens in the blocking agent is from about 10/2 to about 10/8, preferably about 10/4 to about 10/6. The blocking reaction may be carried out either in a solvent having no active hydrogen or in the absence of a solvent. The solvent having no active hydrogen is exemplified by esters such as ethyl acetate, butyl acetate, cellosolve acetate, carbitol acetate or dimethylesters of dibasic acids; ketones such as methyl ethyl ketone, methyl isobutyl ketone or cyclohexanone; and aromatic hydrocarbons such as toluene, xylene, Solvesso #100 or Solvesso #150. When a sulfite-type blocking agent is used, water may be used as a solvent.

TMXDI is substantially half-blocked by the blocking reaction under the conditions as above, and the case is true with the prepolymer of TXMDI which has isocyanate groups at both terminals. When a diol, for example, ethylene glycol, is used as an active hydrogen containing compound in the preparation of the prepolymer of TMXDI, the resultant prepolymer has an isocyanate group at either terminal. However, when a triol, for example, trimethylol propane, is used in part in place of a diol as an active hydrogen containing compound, then the resultant prepolymer has three or more isocyanate groups therein. The blocking reaction of such prepolymer under the conditions as above provides those that have one or two blocked isocyanate groups and one or two free isocyanates groups.

The thermosetting resin of the invention is prepared by use of half-blocked TMXDI and/or its prepolymer which thus has at least one blocked isocyanate group and at least one free isocyanate group preferably by the methods as previously described.

In the first method as previously mentioned, the half-blocked TMXDI or the partially blocked prepolymer is first reacted with an epoxy group containing compound which has at least one active hydrogen. The group which has the active hydrogens may be hydroxyls, carboxyls or aminos, either primary or secondary. The hydroxyls are especially preferred.

Some examples of the epoxy group containing compounds having hydroxyls include epoxydized polyphenols which may be prepared by the etherification of a polyphenol compound with, for example, epichlorohydrin or dichlorohydrin in the presence of an alkali. The polyphenol compound is exemplified by 2,2-bis(4-hydroxyphenyl)propane, 4,4'-dihydroxybenzophenone, 1,1-bis(4'-hydroxyphenyl)ethane, 1,1-bis(4'-hydroxyphenyl)isobutane, 2,2-bis(4'-hydroxy-tert.-butylphenyl)propane, bis(2-hydroxynaphthyl)methane, 1,5-dihydroxynaphthalene and compounds similar thereto. Novolac resins or similar polyphenol resins may be usable as well, ans also polyglycidyl ethers of polyhydric alcohols and polyglycidyl esters of polybasic carboxylic acids.

An especially preferable epoxy group containing compound is exemplified by acrylic resins containing both epoxy groups and hydroxyl groups. These acrylic resins are formed by copolymerizing of an epoxy group containing unsaturated monomer, a hydroxyl group containing unsaturated monomer and an ethylenic unsaturated monomer.

The epoxy group containing unsaturated monomer is exemplified by glycidyl acrylate, glycidyl methacrylate, butadiene monoepoxide, glycidyloxyethyl vinyl sulfide, glycidyl sorbate, glycidyl recinoleate and glycidyl vinyl phthalate. Among these monomers are preferred glycidyl acrylate and glycidyl methacrylate, since they are readily copolymerizable, but also the epoxy groups in the copolymer are highly reactive. They hydroxy group containing unsaturated monomer is exemplified by 2-hydroxyethyl acrylate, 2-hydroxyethyl methacrylate, 2-hydroxypropyl methacrylate and N-methylol acrylamide.

The ethylenic unsaturated monomer is exemplified by acrylates such as methyl acrylate, ethyl acrylate, n-butyl acrylate or 2-ethylhexyl acrylate; methacrylates such as methyl methacrylate, ethyl methacrylate or n-butyl methacrylate; fatty acid vinyl esters such as vinyl acetate or vinyl propionate; aliphatic monoolefins such as ethylene, propylene or isobutene; aromatic monoolefins such as styrene or vinyl toluene; and others including acrylonitrile, vinyl chloride or vinyl fluoride.

The copolymer of the epoxy group containing unsaturated monomer, hydroxy group containing unsaturated monomer and ethylenic unsaturated monomer as above may be advantageously prepared by, for example, solution polymerization of the monomers. It is preferred that a solvent unsed in the copolymerization be a solvent of the resin of the invention.

The copolymerization reaction may be usually carried out in total monomer concentrations of about 20-80% by weight in the presence of an oil-soluble polymerization initiator which generates free radicals, such as $\alpha,\alpha'$-azobisisobutyronitrile, benzoyl peroxide, lauroyl peroxide, t-butyl hydroperoxide or cumene hydroperoxide, and when necessary, together with a redox catalyst using a suitable reducing substance. Further, as a molecular weight adjusting agent of the copolymer, a small amount of, for example, butyl mercaptan, dodecyl mercaptan, t-dodecyl mercaptan, $\beta$-mercaptoethanol and the like may be used in the copolymerization reaction. The copolymerization reaction may be usually carried out in an inert gas atmosphere under normal pressures at about 30°-100° C.

The reaction between the half-blocked TMXDI or the partially blocked prepolymer with the epoxy group containing compound having active hydrogens therein is carried out at such an equivalent ratio of the isocyanate groups to the active hydrogens, especially of the hydroxyl groups, in the epoxy group containing compound, that the final ratio of the blocked isocyanate groups to the active hydrogens, especially of the hydroxyl groups, in the resultant resin, be about 2/8-8/2, preferably 4/6-6/4. The reaction is usually carried out at temperatures of about 40°-150° C., preferably 80°-100° C., for about 2-6 hours, optionally with the use of a catalyst. The catalyst usable includes, for example, tin compounds such as dibutyltin dilaurate, dibutyltin oxide, dibutyltin dichloride and tetrabutyl-1,3-diacetoxydistannoxane. The amount of the catalyst is preferably 0.005-0.5% by weight based on the weight of the reactants.

The reaction may be carried out either in a solvent which has no active hydrogen or in the absence of a solvent. The solvent having no active hydrogen is exemplified by esters such as ethyl acetate, butyl acetate, cellosolve acetate, carbitol acetate or dimethylesters of dibasic acids; ketones such as methyl ethyl ketone, methyl isobutyl ketone or cyclohexanone; and aromatic hydrocarbons such as toluene, xylene, Solvesso #100 or Solvesso #150.

In the reaction of the half-blocked TMXDI or the partially blocked prepolymer with the epoxy group containing compound which has at least one active hydrogen therein, when the active hydrogen is one of the hydroxyl group, then urethane linkage is formed between the half-blocked TMXDI or the prepolymer through the free isocyanate groups.

In the first method as described hereinbefore, the thus obtained product is then reacted with primary or secondary amines which has active hydrogens, to form a product which has amino groups therein together with hydroxyl groups by the ring-cleavage of the epoxy group.

The primary amine usable includes, for example, methylamine, ethylamine, propylamine, butylamine, methanol amine, ethanol amine, propanol amine, isopropanol amine and butanol amine; and the secondary amine usable includes, for example, diethylamine, dipropylamine, dibutylamine, methylbutylamine, dimethanol amine, diethanol amine and dipropanol amine. Tertiary amines may also be usable when they have active hydrogens such as hydroxyl hydrogens in place of amino hydrogens. Therefore, the tertiary amine usable includes, for example, dimethylethanol amine, dimethylpropanol amine, dimethylbutanol amine, diethylethanol amine, triethylathanol amine, triisopropanol amine, 2-[2-(dimethylamino)ethoxy]ethanol, 1-[1-(dimethylamino)-2-propoxy]-2-propanol, 2-(2-[2-(dimethylamino)ethoxy]ethoxyethanol, 1-[2-(dimethylamino)ethoxy]-2-propanol, and 1-(1-[1-(dimethylamino)-2-propoxy]-2-propoxy)-2-propanol.

Among the amines set forth above, secondary amines are particularly preferred, since they rapidly react with the epoxy group, and at the same time, produce tertiary amino groups. In most cases, lower amines are employed, but monoamines having a high molecular weight or a mixture of lower amines and higher amines may be used.

The reaction of the amine with the epoxy group containing resin is carried out usually at temperatures of about 40°-150° C., preferably at about 70°-110° C. either in a solvent which has no active hydrogen or in the absence of a solvent. As just the same as beforementioned, the solvent having no active hydrogen includes esters such as ethyl acetate, butyl acetate, cellosolve acetate, carbitol acetate or dimethyl ester of dibasic acids; ketones such as methyl ethyl ketone, methyl isobutyl ketone or cyclohexanone; and aromatic hydrocarbons such as toluene, xylene, Solvesso #100 or Solvesso #150.

The amine is used in amounts sufficient to solubilize the resultant resin in water after the amino group has been converted to quaternary ammonium salts as hereinafter described. In other words, the amine is used in amounts sufficient for the resultant resin to move toward and deposit on a cathode in the cationic electrodeposition coating in water or hydrophilic organic solvents or a mixture of these after the amino group has been converted to quaternary ammonium salts with an acid.

More specifically, when the primary amine is used, the amount is so selected that the equivalent ratio of the amino groups to the epoxy groups in the resin is about 0.1–0.5, whereas when the secondary amine is used, the amount is so selected that the equivalent ratio of the amino groups to the epoxy groups in the resin is about 0.5–1.1. When such a tertiary amine as beforementioned is used, however, the amount used is dependent upon the number of active hydrogens which the amine has. For example, when the tertiary amine is a dialkanol amine such as diethanol amine, the amount of the tertiary amine is so selected that the equivalent ratio of the hydroxyl groups to the epoxy groups in the resin is about 0.1–0.5.

In particular, the reaction of the secondary amine with the epoxy group containing resin causes ring-cleavage of the epoxy group to produce tertiary amine groups together with hydroxyl groups in the resulting product. In this reaction, all of the epoxy groups may be ring-cleaved or part of them may be left as they are without being ring-cleaved.

The thus resultant product is then solubilized in water by being converted to forms of quaternary ammonium salts. This water-solubilizing of the resin is carried out by reacting the resin with an acid to convert the tertiary amino groups to quaternary ammonium salts. The acid usable may be either organic or inorganic. The organic adid includes, for example, lactic acid, acetic acid, formic acid, propionic acid and butyric acid; and the inorganic adid includes, for example, hydrochloric acid, phosphoric acid, sulfuric acid and boric acid. These acids form salts with the quaternarized nitrogens, and the greater the dissociation constant of the salt, the more preferable the salt. The acid is used in amounts sufficient to convert the tertiary amino groups in the resin to the quaternary ammonium salts.

The thus obtained resin has at least one group represented by the formula of

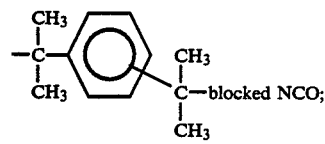

hydroxyls; and quaternary ammonium salt groups which solubilize the resin in water; the blocked NCO groups being stable in the presence of water, but reactive with the hydroxyl groups at elevated temperatures.

In the aforedescribed second method, an epoxy group containing compound is first reacted with such amines having active hydroges as employed in the aforedescribed first method. The reaction may be carried out in manners similar to the reaction of the epoxy group containing compound and the amine in the first method.

As examples of the epoxy group containing compound usable in this reaction, there are mentioned, in addition to such as those having at least one active hydrogen, especially one hydroxyl group, those having one epoxy group only, such as glycidyl acrylate, butadiene monoepoxide, glycidyloxyethyl vinyl sulfide, glycidyl sorbate, glycidyl recinoleate and glycidyl vinyl phthalate. In the reaction, at least some of the epoxy groupsp are ring-cleaved by the reaction of the hydrogen of the amine to the epoxy group, to provide a reaction product which has hydroxyl groups and tertiary amino groups.

The reaction product is then reacted with the half-blocked TMXDI or the partially blocked prepolymer of TMXDI, which are the same as those used in the first method, in manners similar to those in the corresponding reaction in the first method. Then the reaction product is solubilized in the same manner as in the first method, to provide the resin of the invention.

According to the third method, the half-blocked TMXDI or the partially blocked prepolymer is first reacted with a hydroxyl groups containing unsaturated monomer. Examples of this monomer may be 2-hydroxyethyl acrylate, 2-hydroxyethyl methacrylate, 2-hydroxyproyl acrylate, 2-hydroxypropyl methacrylate, N-methylol acrylamide, etc, as those used in the first method. In this reaction, the equivalent ratio of the isocyanate groups to the hydroxyl groups is so selected as to urethanate all the free isocyanate groups. The reaction may be carried out under the conditions similar to those under which the half-blocked TMXDI or the partially blocked prepolymer of TMXDI is reacted with an epoxy group containing compound having at least one active hydrogen, especially one hydroxyl group, in the first method.

The reaction product is then compolymerized with an epoxy group containing unsaturated monomer. The epoxy group containing saturated monomer may be the same as those which are used in the preparation of the acrylic resin which has epoxy and hydroxyl groups therein. Therefore, the epoxy group containing unsaturated monomer usable include glycidyl acrylate, glycidyl methacrylate, butadiene monoepoxide, glycidyloxyethyl vinyl sulfide, glycidyl sorbate, glycidyl recinoleate and glycidyl vinyl phthalate. Among these epoxides are preferred glycidyl acrylate and glycidyl methacrylate.

In the copolymerization, an ethylenic unsaturated monomer may be used together with the epoxy group containing unsaturated monomer, and the ethylenic unsaturated monomer usable may be the same as those which are referred to hereinbefore. Thus, the ethylenic unsaturated monomer usable includes acrylates such as methyl acrylate, ethyl acrylate, n-butyl acrylate or 2-ethylhexyl acrylate; methacrylates such as methyl methacrylate, ethyl methacrylate or n-butyl methacrylate; fatty acid vinyl esters such as vinyl acetate or vinyl propionate; aliphatic monoolefins such as ethylene, propylene or isobutene; aromatic monoolefins such as styrene or vinyl toluene; and, besides, acrylonitrile, vinyl chloride or vinyl fluoride.

The copolymerization reaction may be carried out under the conditions similar to those under which the acrylic resin which has epoxy and hydroxyl groups therein is prepared in the first method.

The reaction product is then reacted with such active hydrogen containing amines as employed in the first method, to cause the ring-cleaveage of the epoxy groups contained in the copolymer so as to form tertiary amino groups togeter with hydroxyl groups in the copolymer in the manner similar to that in the first method. The reaction product is then solubilized in the form of the quaternary ammonium salt in the same manner as in the first method.

As readily understood, the resin obtained either by the first method or by the second method has at least one group represented by the formula of

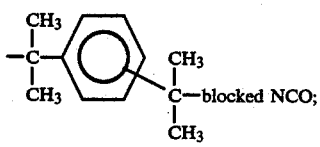

hydroxyl groups; and quaternary ammonium salt groups which solubilize the resin in water; the blocked NCO groups being stable in the presence of water, but reactive with the hydroxyl groups at elevated temperatures.

In any of the first, second and third methods as described hereinbefore, the solubilization of the resin may be carried out in the presence of water, hydrophilic organic solvents, or a mixture of these, and further surfactants, pigments, dissociation catalysts or other aditives to form electrodepositon coating compositions.

The hydrophilic organic solvent usable is exemplified by alcohols such as ethanol, n-propanol, isopropanol, n-butanol, tert.-butanol or isobutanol; glycol ethers such as ethylene glycol monomethyl ether, ethylene glycol monoethyl ether, ethylene glycol mono-n-propyl ether, ethylene glycol monoisopropyl ether, ethylene glycol monobutyl ether or diethylene glycol monobutyl ether; esters such as methyl acetate, ethyl acetate, isopropyl acetate, methyl acetoacetate, ethyl acetoacetate, ethtylene glycol monomethyl ether acetate, ethtylene glycol monoethyl ether acetate, diethylene glycol monomethyl ether acetate, diethylene glycolmonoethyl ether acetate or diethylene glycol monobutyl ether acetate; and ketones such as methyl ethyl ketone, methyl butyl ketone or cyclohexanone.

The surfactant used is preferably nonionic or cationic one, the former being exemplified by polyethylene glycols derivatives such as polyethylene glycol alkyl esters, polyethylene glycol alkyl ethers, polyethylene glycol alkyl phenyl ethers or polyethylene glycol alkyl amides, and polyhydric alcohol partial esters such as sorbitan fatty acid esters; and the latter being exemplified by long-chain aliphatic amine salts or quaternary ammonium salts.

The pigment may be any one which is used in conventional coating compositions. Usually the pigment is added to water, hydrophilic organic solvents or a mixture of these so that the resultant mixture has a suitable viscosity, and then the pigment is dispersed into the medium by means of, for example, a ball mill, cawless dissolver, attritor or roll mill until particles of the pigment reach desired size, usually about 10 $\mu$m or less.

The electrodepositable coating composition thus obtained has a solids content preferably of about 5–20% by weight.

The electrodeposition using the composition of the invention is applicable to any electrical conductive substrate as in the conventional electrodeposition coating, and is especially preferably applicable to metal substrates such as of steel, aluminum or copper.

In the electrodeposition, the electrodeposition coating composition is placed in a bath, and there is applied a voltage of about 150–300 V for about 1–10 minutes across an anode and a cathode as a substrate to be coated, so that the solubilized resin is deposited on the cathode. The coated substrate is then taken out of the bath, washed with water, and then is baked at temperatures of about 130°–150° C. for about 15–60 minutes, to dissociate the blocking agent from the blocked isocyanate groups in the resin to generate free isocyanate groups, which in turn react with hydroxyl groups in the resin, thereby to form cured coating.

The electrodeposition coating composition containing the resin of the invention as set forth hereinbefore is excellent in storability, and there takes no gellation after storage, for example, at 45° C. for three months. Moreover, the composition is curable at temperatures lower than the conventional ones by about 30°–75° C., thus needing much less heat energy than in the baking of coatings with the conventional electrodeposition coating compositions.

Further, the resultant coating formed by the composition of the invention is especially excellent in weatherability and corrosion resistance, thus being suitably usable as top coating as well as primer for automobiles, and of course usable for coating of household appliances and construction products.

The invention will be more easily understood with reference to the following examples, which however are intended to illustrate the invention only and are not to be construed as limiting the scope of the invention. In the examples, weights and percentages are by weight.

EXAMPLE 1

To a mixture of 122 parts of m-TMXDI, 187 parts of cyclohexanone and 0.07 parts of tetra-n-butyl-1,3-diacetyloxydistannoxane (Formate TK-1 by Takeda Chemical Industry, Ltd., Japan) was added dropwise while stirring at 65° C. under nitrogen stream 65 parts of 2-ethyl hexanol over about two hours. The reaction was carried out for further four hours, to provide half-blocked m-TMXDI whose amine equivalent was 784.

A solution of 174 parts of epoxy resin (Epotohto YD-014 by Tohto Kasei., Co. Ltd., Japan; epoxy equivalent of 950 and OH equivalent of 348) dissolved in 174 parts of cyclohexanone was added to the above reaction product, and the reaction was carried out at 70°–75° C. for five hours until no free isocyanate was detected by IR spectroscopy.

Then the temperature of the reaction mixture was adjusted to be about 60° C., and there was added thereto 13.4 parts of diethylamine over 15 minutes, and the reaction was carried out at 100° C. for another one hour. To the resultant solution was added 16.3 parts of lactic acid and 1853 parts of deionized water, to provide a solubilized resin in the form of quaternary ammonium salts.

An amount of 1000 parts of the thus obtained resin solution was mixed with 150 parts of titanium dioxide (Tipaque CR-90 by Ishihara Chemical Industries, Ltd., Japan), 500 parts of deionized water, 500 parts of isopropanol and 2.3 parts of polyoxyalkyl phenol ether surfactant (Emulgen 910 by Kao Atlas Co., Ltd., Japan), and the mixture was pebble-milled for 24 hours, to provide a white electrodeposition coating composition.

The electrodeposition onto a steel plate treated with zinc phosphate was carried out by use of the composition under the conditions of applied voltage of 190 V for 3 minutes at a bath temperature of 30° C.

The properties of the resultant coating are shown in Table 1.

REFERENCE EXAMPLE 1

An amount of 87.1 parts of 2,4-tolylene diisocyanate was half-blocked at a temperature not more than 20° C. but otherwise in the same manner as in Example 1 using 65.1 parts of 2-ethyl hexanol in the presence of 0.06 parts of Formate TK-1 in 152.2 parts of cyclohexanone.

To the resultant solution of the half-blocked diisocyanate was added 174 parts of the same epoxy resin as used in Example 1 in 174 parts of cyclohexanone, and the reaction was carried out in the same manner as in Example 1. Thereafter, the reaction product was reacted with 13.4 parts of diethylamine, and then to the resultant solution was added 16.2 parts of lactic acid and 1690 parts of deionized water, to provide a solubilized resin in the same manner as in Example 1.

A white electrodepositable coating composition was prepared by use of 1000 parts of the thus obtained resin solution in the same manner as in Example 1, and the properties of the resultant coating with the composition are shown in Table 1.

TABLE 1

| | Example 1 | Reference Example 1 |
|---|---|---|
| Curing[1] | 145° C. × 30 min. | 175° C. × 30 min. |
| Properties of coatings | | |
| Gloss (60° specular reflection factor) | 84 | 82 |
| Pencil hardness | 2H–3H | 3H |
| Erichsen test (mm) | 4.0 | 3.5 |

TABLE 1-continued

| | Example 1 | Reference Example 1 |
|---|---|---|
| Bending test (φ mm) | 6 | 6 |
| Alkali resistance[2] | no change | no change |
| Acid resistance[3] | no change | no change |
| Corrosion resistance[4] | no change | no change |
| Weatherability[5] | | |
| ΔE | 2.2 | 17.5 |
| GR (%) | 65 | 25 |

Notes:
[1]xylene rubbing method (not more 100 times)
[2]5% NaOH at room temperatures for 30 days
[3]5% H$_2$SO$_4$ at room temperatures for 30 days
[4]NaCl/CH$_3$COOH/H$_2$O$_2$/tap water = 5/1/0.5/93.5 (by weights) at room temperatures for 10 days
[5]QUV test of 1000 hours ΔE: degree of discoloration; GR (%): gloss retention ratio.

EXAMPLE 2

A mixture of 150 parts of 2-hydroxyethyl methacrylate, 350 parts of n-butyl acrylate, 300 parts of methyl methacrylate, 200 parts of glycidyl methacrylate, 17 parts of azobisisobutyronitrile and 33 parts of t-dodecyl mercaptan was added dropwise over about 4 hours to 670 parts of ethylene glycol monoethyl ether acetate kept at 90° C. in a reaction vessel under nitrogen stream, during which the reaction mixture exothermed up to 135° C. at a maximum. After completion of the reaction, the reaction mixture was cooled, to which was added 0.8 parts of hydroquinone. The resultant acrylic resin contained epoxy groups and hydroxyl groups, and was found to have a solids content of 60.5%, a hydroxyl value of 1450 and an epoxy equivalent of 838.

To a mixture of 122 parts of m-TMXDI, 312 parts of diethylene glycol monoethyl ether acetate and 0.096 parts of Formate TK-1 was added dropwise over about two hours while stirring at 75° C. under nitrogen stream 45 parts of ethylene glycol monethyl ether, and the reaction was carried out for further four hours, to provide half-blocked m-TMXDI whose amine equivalent was 958.

A solution of 724 parts of the acrylic resin as above was added to the solution of the half-blocked m-TMXDI, and the reaction was carried out at 70°–75° C. for five hours until no free isocyanate was detected by IR spectroscopy.

Then the temperature of the reaction mixture was adjusted to be about 60° C., and there was added dropwise thereto 87.7 parts of dipropylamine over 40 minutes, and the reaction was carried out at another one hour. To the resultant solution was then added 64.2 parts of propinic acid, 4747 parts of deionized water and 1432 parts of ethylene glycol monoethyl ether, to provide a solubilized resin in the form of quaternary ammonium salts.

An amount of 1000 parts of the resin solution was mixed with 100 parts of Tipaque CR-90, 2.2 parts of Emulgen 910, 700 parts of deionozed water and 300 parts of isopropanol, and the mixture was pebble-milled for 24 hours to provide a white electrodeposition coating composition.

The properties of the coating with the composition are shown in Table 2.

TABLE 2

| | Example 2 | Example 3 | Example 4 | Reference Example 2 | Reference Example 3 |
|---|---|---|---|---|---|
| Curing | 145° C. × 30 min. | 135° C. × 30 min. | 145° C. × 30 min | 180° C. × 30 min. | 210° C. × 30 min. |

TABLE 2-continued

|  | Example 2 | Example 3 | Example 4 | Reference Example 2 | Reference Example 3 |
| --- | --- | --- | --- | --- | --- |
| Properties of coatings |  |  |  |  |  |
| Gloss (60° specular reflection factor) | 84 | 88 | 86 | 78 | 86 |
| Pencil hardness | H-2H | 2H | H | 2H | F |
| Erichsen test (mm) | 6.5 | 7.0 | 7.2 | 4.5 | 7.0 |
| Bending test ($\phi$ mm) | 4 | 4 | 4 | 6 | 4 |
| Alkali resistance | no change | no change | no change | no change | no change |
| Acid resistance | no change | no change | no change | no change | no change |
| Corrosion resistance | no change | no change | no change | no change | no change |
| Weatherability |  |  |  |  |  |
| $\Delta E$ | 1.8 | 2.0 | 1.4 | 14.2 | 2.1 |
| GR (%) | 78 | 76 | 81 | 28 | 45 |

REFERENCE EXAMPLE 2

An amount of 87.1 parts of 2,4-tolylene diisocyanate was half-blocked at a temperature not more than 25° C. but otherwise in the same manner as in Example 2 using 45 parts of ethylene glycol monoethyl ether by use of 0.08 parts of Formate TK-1 in 277 parts of diethylene glycol monethyl ether acetate.

To the resultant solution of the half-blocked diisocyanate was added 724 parts of the same acrylic resin solution as used in Example 2, and the reaction was carried out in the same manner as in Example 2. Thereafter, the reaction product was reacted with 87.7 parts of dipropylamine, and then to the resultant solution was added 64.2 parts of propionic acid, 1373 paerts of diethylene glycol monoethyl ether and 4526 parts of deionized water, to provide a solublized resin in the same manner as in Example 2.

A white electrodepositable coating composition was prepared by use of 1000 parts of the thus obtained resin solution in the same manner as in Example 2, and the properties of the resultant coating with the composition are shown in Table 2.

REFERENCE EXAMPLE 3

An amount of 84.1 parts of hexamethylene diisocyanate was half-blocked at 65° C. but otherwise in the same manner as in Example 2 using 45 parts of ethylene glycol monethyl ether by use of 0.08 parts of Formate TK-1 in 274 parts of diethylene glycol monethyl ether acetate.

To the resultant solution of the half-blocked diisocyanate was added 724 parts of the same acrylic resin solution as used in Example 2, and the reaction was carried out in the same manner as in Example 2. Thereafter, the reaction product was reacted with 87.7 parts of dipropylamine, and then to the resultant product was added 64.2 parts of propionic acid, 1368 paerts of diethylene glycol monoethyl ether and 4507 parts of deionized water, to provide a solubilized resin in the same manner as in Example 2.

A white electrodeposition coating composition was prepared by use of 1000 parts of the thus obtained resin solution in the same manner as in Example 2, and the properties of the resultant coating with the composition are shown in Table 2.

EXAMPLE 3

An amount of 122 parts of m-TMXDI was half-blocked at 70° C. but otherwise in the same manner as in Example 2 using 56.6 parts of ε-caprolactam by use of 0.13 parts of Formate TK-1 in 468 parts of diethylene glycol monethyl ether acetate.

To the resultant solution of the half-blocked diisocyanate was added 1447 parts of the same acrylic resin solution as used in Example 2, and the reaction was carried out in the same manner as in Example 2. Thereafter, the reaction product was reacted with 178.7 parts of dibutylamine, and then to the resultant solution was added 149.8 parts of lactic acid, 1291 parts of diethylene glycol monoethyl ether and 5456 parts of deionized water, to provide a solubilized resin in the same manner as in Example 2.

A white electrodeposition coating composition was prepared by use of 1000 parts of the thus obtained resin solution in the same manner as in Example 2, and the properties of the resultant coating with the composition are shown in Table 2.

EXAMPLE 4

A mixture of 122 parts of m-TMXDI, 163 parts of diethylene glycol monoethyl ether acetate and 0.08 parts of Formate TK-1 was heated to 75°-80° C., to which was added dropwise under nitrogen stream 65 parts of 2-ethyl hexanol over about two hours. The reaction was carried out for further one hour, to provide half-blocked m-TMXDI whose amine equivalent was 700. An amount of 58 parts of 2-hydroxyethyl acrylate was then added to the resultant reaction product, and the mixture was heated at 75° C. for 3 hours, to provide a vinyl urethane which had no free isocyanate group.

A mixture of 408 parts of the above vinyl urethane, 135 parts of n-butyl acrylate, 116 parts of methyl methacrylate, 77 parts of glycidyl methacrylate, 58 parts of 2-hydroxyethyl acrylate, 0.2 parts of t-dodecyl mercaptan and 0.1 parts of azobisisobutyronitrile was added dropwise over about 4 hours to 258 parts of ethylene glycol monethyl ether kept at 90° C. in a reaction vessel under nitrogen stream, during which the reaction mixture exothermed up to 128° C.

After completion of the reaction, the reaction mixture was cooled, and there were added thereto 0.005 parts of hydroquinone. The resultant acrylic resin was found to have a solids content of 60.8%, a hydroxyl equivalent of 2104 and an epoxy equivalent of 1940.

An amount of 39.4 parts of diethylamine was added to the above acrylic resin solution kept at 60° C. over 30 minutes, and the reaction was carried out for further one hour. To the resultant product were added 48.6 parts of lactic acid, 4531 parts of deionized water and 1521 parts of ethylene glycol monoethyl ether acetate, to provide a solubilized resin in the form of quaternary ammonium salt.

An amount of 1000 parts of the resin solution was mixed with 100 parts of Tipaque CR-90, 2.2 parts of Emulgen 910, 600 parts of deionozed water and 400 parts of isopropanol, and the mixture was pebble-milled for 24 hours, to provide a white electrodeposition coating composition.

The properties of the coating with the composition are shown in Table 2.

EXAMPLE 5

An amount of 122 parts of m-TMXDI was half-blocked in the same manner as in Example 2 using 47 parts of phenol by use of 0.1 parts of Formate TK-1 in 314 parts of diethylene glycol monoethyl ether acetate.

To the resultant solution of the half-blocked diisocyanate was added 724 parts of the same acrylic resin solution as used in Example 2, and the reaction was carried out in the same manner as in Example 2. Thereafter, the reaction product was reacted with 87.7 parts of dipropylamine, and then to the resultant solution was added 64.2 parts of propionic acid, 1435 parts of diethylene glycol monoethyl ether and 4750 parts of deionized water, to provide a solubilized resin in the same manner as in Example 2.

An amount of 1000 parts of the resin solution was mixed with 100 parts of Tipaque CR-90, 2.2 parts of Emulgen 910, 700 parts of deionized water and 300 parts of isopropanol, and the mixture was pebble-milled for 24 hours to provide a white electrodepositable coating composition.

The properties of the coating with the composition are shown in Table 3.

EXAMPLE 6

To a mixture of 244 parts of m-TMXDI, 500 parts of cyclohexanone and 0.2 parts of Formate TK-1 was added dropwise while stirring at 70°–75° C. under nitrogen stream 67 parts of dipropylene glycol over about four hours. After the reaction, 44 parts of methyl ethyl ketoxime were added dropwise to the reaction mixture at 20°–25° C. and the reaction was carried out for 2 hours, to provide a half-blocked diisocyanate which had an amine equivalent of 1710.

An amount 724 parts of the acrylic resin solution prepared in Example 2 was reacted with the above reaction product, and then followed by the addition to the reaction product of 64 parts of propionic acid, 5529 parts of deionized water and 2370 parts of ethylene glycol monoethyl ether.

An amount of 1000 parts of the resin solution was mixed with 100 parts of Tipaque CR-90, 2.2 parts of Emulgen 910, 700 parts of deionized water and 500 parts of isopropanol, and the mixture was then pebble-milled for 24 hours, to provide a white electrodeposition coating composition.

The properties of the coating with the composition were determined in the same manner as in Table 1, and the results are shown in Table 3.

TABLE 3

|  | Example 5 | Example 6 |
|---|---|---|
| Curing | 130° C. × 30 min. | 130° C. × 30 min. |
| Properties of coatings |  |  |
| Gloss (60° specular reflection factor) | 81 | 84 |
| Pencil hardness | H | F-H |

TABLE 3-continued

|  | Example 5 | Example 6 |
|---|---|---|
| Erichsen test (mm) | 6.0 | 7.4 |
| Bending test (φ mm) | 4 | 3 |
| Alkali resistance | no change | no change |
| Acid resistance | no change | no change |
| Corrosion resistance | no change | no change |
| Weatherability |  |  |
| ΔE | 1.9 | 1.6 |
| GR (%) | 75 | 80 |

EXAMPLE 7

To a mixture of 122 parts of m-TMXDI, 187 parts of cyclohexanone and 0.07 parts of Formate TK-1 was added dropwise while stirring at 60°–65° C. under nitrogen stream 65.1 parts of 2-ethyl hexanol over about two hours, and the reaction was carried out for further 4 hours, to provide half-blocked diisocyanate of an amine equivalent of 748.

An amount of 13.4 parts of diethylamine was added dropwise to 174 parts of the same epoxy resin as used in Example 1 in 174 parts of cyclohexanone over 15 minutes, and the reaction was carried for further one hour at 100° C. After the reaction product was found to contain no epoxy group therein by IR spectroscopy, 374 parts of the half-blocked diisocyanate solution were added to the above solution of the aminated epoxy resin, and the reaction was carried out at 70°–75° C. for 6 hours until no free isocyanate group was detected by IR spectroscopy.

An amount of 16.2 parts of lactic acid and 1853 parts of deionized water were added to the resultant solution, to solubilize the resin in water.

An amount of 1000 parts of the resin solution was mixed with 150 parts of Tipaque CR-90, 2.3 parts of Emulgen 910, 500 parts of deionized water and 500 parts of isopropanol, and the mixture was pebble-milled for 24 hours, to provide a white electrodeposition coating composition.

The properties of the coating with the composition were determined in the same manner as in Table 1, and the results are shown in Table 4.

TABLE 4

|  | Example 7 |
|---|---|
| Curing | 145° C. × 30 min. |
| Properties of coatings |  |
| Gloss (60° specular reflection factor) | 88 |
| Pencil hardness | 2H-3H |
| Erichsen test (mm) | 4.0 |
| Bending test (φ mm) | 6 |
| Alkali resistance | no change |
| Acid resistance | no change |
| Corrosion resistance | no change |
| Weatherability |  |
| ΔE | 2.3 |
| GR (%) | 69 |

What is claimed is:

1. A thermosetting resin which contains therein:
(a) groups represented by the formula of

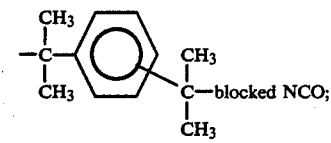

(b) hydroxyl groups; and
(c) quaternary ammonium salt groups which solubilize the resin in water;

the blocked NCO groups being stable in the presence of water, but reactive with the hydroxyl groups at elevated temperatures.

2. A method for producing a thermosetting resin which comprises:
   (a) reacting half-blocked $\alpha,\alpha,\alpha',\alpha'$-tetramethylxylene diisocyanate or a prepolymer of $\alpha,\alpha,\alpha',\alpha'$-tetramethylxylylene diisocyanate having at least one half-blocked isocyanate group and at least one free isocyanate group with an epoxy group containing compound having at least one hydroxyl group;
   (b) reacting the reaction product with an amine having active hydrogens to form a product which has amino groups therein; and
   (c) reacting the product with an acid to convert at least part of the amino groups to quaternary ammonium salts, thereby to solubilize the product in water.

3. A method for producing a thermosetting resin which comprises:
   (a) reacting an epoxy group containing compound with an amine having active hydrogens to form a product which has amino groups therein;
   (b) reacting the product with half-blocked $\alpha,\alpha,\alpha',\alpha'$-tetramethylxylylene diisocyanate or a prepolymer of $\alpha,\alpha,\alpha',\alpha'$-tetramethylxylylene diisocyanate having at least one half-blocked isocyanate group and at least one free isocyanate group; and
   (c) reacting the product with an acid to convert at least part of the amino groups to quaternary ammonium salts, thereby to solubilize the product in water.

4. A method for producing a thermosetting resin which comprises:
   (a) reacting half-blocked $\alpha,\alpha,\alpha',\alpha'$-tetramethylxylylene diisocyanate or a prepolymer of $\alpha,\alpha,\alpha',\alpha'$-tetramethylxylylene diisocyanate having at least one half-blocked isocyanate group and at least one free isocyanate group with an unsaturated monomer having hydroxyl groups;
   (b) copolymerizing the resultant reaction product with an unsaturated monomer having epoxy groups;
   (c) reacting the resulting copolymer with an amine having active hydrogens to form a product which has amino groups therein; and
   (d) reacting the product with an acid to convert at least part of the amino groups to quaternary ammonium salts, thereby to solubilize the product in water.

5. A cationic electrodeposition coating composition which comprises a thermosetting resin containing therein:
   (a) groups represented by the formula of

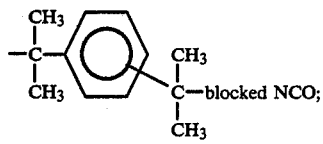

(b) hydroxyl groups; and
   (c) quaternary ammonium salt groups which solubilize the resin in water;

the blocked NCO groups being stable in the presence of water, but reactive with the hydroxyl groups at elevated temperatures, solubilized in water, hydrophilic organic solvents or mixtures of these.

* * * * *